INVENTOR.
HIDEO MIYAUCHI
BY Stanley Wolder
ATTORNEY

3,451,324
CAMERA VIEWING AND LIGHT MEASURING SYSTEM

Hideo Miyauchi, Suwa-gun, Nagano-ken, Japan, assignor to Kabushiki Kaisha Yashica, Tokyo-to, Japan, a corporation of Japan
Filed Jan. 23, 1967, Ser. No. 611,160
Claims priority, application Japan, Jan. 22, 1966, 41/3,591
Int. Cl. G03b *19/12, 9/02;* G01j *1/52*
U.S. Cl. 95—42                                6 Claims

ABSTRACT OF THE DISCLOSURE

A semi-mirrored surface inclined at 45° is positioned between the lenses of a camera photographic objective which focuses an image on a rearwardly positioned plane. A viewing optical system faces the forwardly directed face of the semi-mirrored surface and is located on one side thereof and a photoconductor faces the rearwardly directed face of the semi-mirrored surface and is located on the opposite side thereof. A semi-mirrored surface or a small mirror element directed toward the photoconductor is located between the principal semi-mirrored surface and the viewing system. An automatic diaphragm controlled by the photoconductor is positioned between the objective lenses.

Background of the invention

The present invention relates generally to improvements in camera light measuring systems and it relates particularly to an improved combination of a camera including a through-the-lens viewing system employing a semi-reflector optical device disposed in the path of the image forming rays, and an automatic diaphragm controlled by a light responsive element exposed to the light traversing the objective lens.

The automatic light responsive exposure control systems in photographic cameras are generally of two types, namely the external light receiving type and the internal light receiving or through-the-lens type (TTL type), classified according to the location and exposure of the light responsive control element of the system relative to the camera optical system. In the former type the light receiving control element is positioned at the front side of the camera casing to receive the light through a window arranged in the camera casing, while in the latter type the light receiving control element is positioned within the path of the light rays that have passed through the objective lens or within the light path of the viewfinder, so as to directly measure the intensity of the light passing through the objective.

The effectiveness and operation of the internal light receiving type of light measuring or automatic exposure control system is superior to that of the external light receiving type in that the former can always achieve an accurate light measurement even if the image angle should vary owing to the interchange of the objective or the use of zoom lenses. Thus, the internal light receiving type of exposure control system has been increasingly employed in photographic cameras. It has been conventional in such internal light measuring systems that the light sensitive receiving element is located relative to the objective light path in such a manner as not to obstruct the film exposure or viewfinder operation, or alternatively a part of the light passing through the viewfinder is led to the light sensitive receiving element.

In the former method, with the light receiving light sensitive element positioned adjacent to the objective light path, the intensity of the light incident on the light sensitive element is apt to vary according to local brightness of the object to be photographed so that the exposure value corresponding to the average object brightness may not be obtained. In the latter method utilizing a part of viewfinder light, adapted mainly for cine-cameras, while a higher accuracy is achieved in detecting average object brightness, the light intensity for the viewfinder is greatly decreased thereby reducing the brightness of the viewfinder field.

Summary of the invention

A principal object of the present invention is to provide an improved light measuring system in photographic cameras.

Another object of the present invention is to provide in a camera an improved through-the-lens light measuring system.

Still another object of the present invention is to provide an improved camera through-the-lens light measuring system wherein a semi-mirrored surface is employed in the field viewing system, characterized in that an accurate overall image light measurement is achieved without adversely affecting the photographed or viewed image.

The above and other objects of the present invention will become apparent from a reading of the following description taken in conjunction with the accompanying drawing which illustrate embodiments of the present invention only by way of illustration.

In a sense the present invention contemplates the provision of the combination of a camera including an objective lens system and a semi-reflector surface positioned across the path of image forming light rays traversing said objective lens system and inclined to the longitudinal axis thereof and a viewfinder optical system positioned on one side of said semi-reflector surface and having directed thereto by said semi-reflector surface a fraction of the light entering said objective lens system, and a photosensitive element positioned on the other side of said semi-reflector surface. The objective lens system advantageously includes a plurality of lens and the semi-reflector surface is disposed between a pair of the objective lenses intersecting the optical axis thereof at an angle of 45°. The front face of the semi-reflector surface faces the objective lens front section and the viewfinder optical system, and the rear face thereof faces the photosensitive element. An automatic diaphragm is positioned behind the semi-reflector surface and is controlled by the photosensitive element.

The light measuring system of the present invention overcomes the drawbacks and disadvantages of the conventional through the lens light measuring system for among other reasons that it measures the overall intensity of the image producing light or the average light intensity of the image forming light incident on the objective lens and does not interfere with or adversely affect the viewfinding system. This is achieved by reason of the light incident on the photosensitive element being that which is normally wasted or not employed such as the lens and diaphragm reflected light and is directly proportional to the overall or average intensity of the objective lens incident image forming light.

Description of the preferred embodiments

Figure 1:
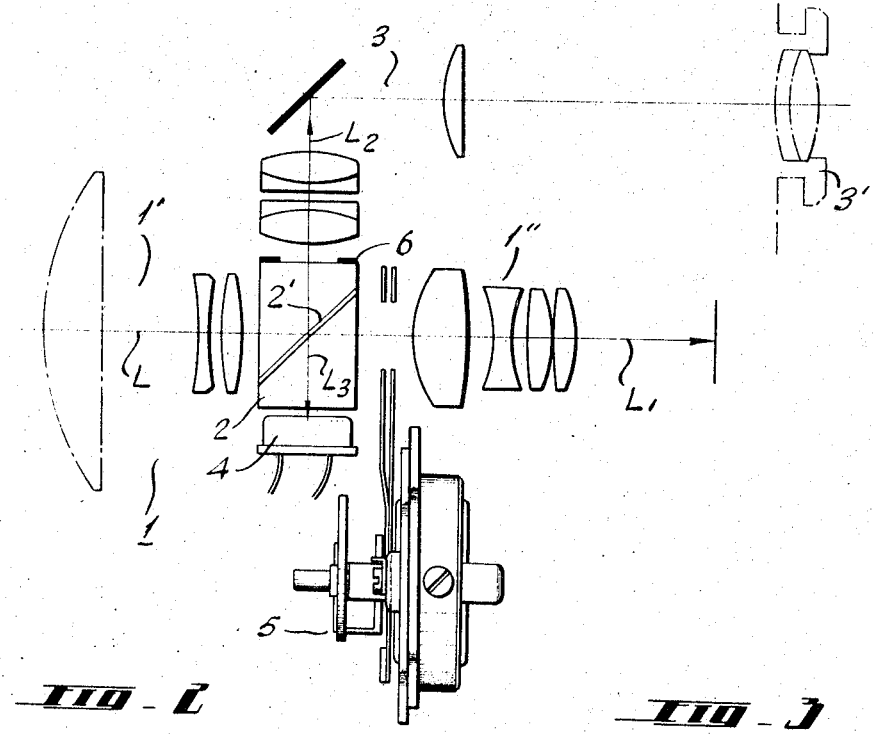
FIGURE 1 is a side elevational view of a light responsive automatic diaphragm control system embodying the present invention.

Referring now to the drawing and particularly FIGURE 1 thereof which illustrates a preferred embodiment of the present invention, the improved camera comprises an objective lens system 1 which may be of conventional design comprising a main front lens group 1' and a longitudinally rearwardly spaced image forming lens group 1''. Positioned between the objective lens groups 1' and 1'' is a half mirror reflecting system 2 of known construction including a semi-reflector surface 2' which is advantageously a transparent reflecting or half mirrored surface which reflects a fraction of the light and transmits a fraction of the light incident on either face thereof. The semi-reflector surface 2' lies in a flat plane and intersects the optical axis of the objective lens system 1 at a 45° angle and has an upwardly rearwardly inclined front face facing forwardly and upwardly and an opposite, inclined face facing rearwardly and downwardly.

A through-the-lens viewfinder optical system 3 which may be of conventional design includes a vertical front lens group axially positioned above and directed toward the semi-reflector device 2 and a horizontal rear lens group including a viewfinder eyepiece 3 located along the optical axis of the viewfinder front lens group by way of a 45° mirror. A photosensitive element 4 which may comprise a photoconductor or photocell is positioned directly below the semi-reflector device 2 with its photosensitive face directed upwardly toward the semi-reflector surface 2' and coaxial with the axis of the viewfinder optical system 3 and positioned on the opposite side of the semi-reflector device 2. A current meter driven automatic diaphragm 5 is mounted to support a variable aperture blade system between the semi-reflector device 2 and the objective rear lens group 1'' with the center of the diaphragm aperture substantially coinciding with the objective lens optical axis and is connected to the photosensitive element 4 by a suitable known network to vary the diaphragm aperture inversely as the intensity of the light incident on the photosensitive element 4. A total horizontal reflecting surface 6 whose underface is the reflector is positioned on the top face of the semi-reflector device 2 and is peripherally shaped and disposed relative to the optical axis of the optical system 3 and the objective front lens group 1' as reflected by the semi-reflector surface 2'.

In operation of the improved light measuring system described above, light rays L entering the semi-reflector optical system 2 are divided by the oblique semi-reflective surface 2' into two fractions or groups of light rays $L_1$ and $L_2$, the rays $L_1$ being that portion of the rays L which pass through the semi-reflector surface 2' and the rays $L_2$ being that portion of the rays L which are reflected by the semi-reflector surface 2'. Thus, a portion of the light that has passed through the objective master lens system 1' is led to the viewfinder. A portion of the light $L_1$ fraction is reflected by the lens surfaces of the image-forming lens system 1'' and by the shutter screen surface. This reflected light enters the semi-reflector optical device 2, and is reflected by the underface of the semi-reflector surface 2' to form a part of the light fraction $L_3$, which is directed toward the photosensitive element 4. In like manner, a portion of the light fraction $L_2$ is reflected by the lens surfaces of the viewfinder optical system 3 and passes through the semi-reflector surface 2' to form another part of the light fraction $L_3$. In conventional camera optical systems of the present type, a portion of the light that has passed the objective 1 is wastefully lost from one side of the semi-reflector optical system 2.

In the arrangement of the present invention the photosensitive element 4 is positioned as described above relative to the semi-reflector optical system 2 so that the photosensitive element 4 receives the light that has been hitherto wastefully lost and subsequently utilizes such light for measuring and control purposes.

Thus the light that has passed through the objective lens system 1 need not be further divided for the purpose of light measurement and is therefore effectively utilized for film exposure and viewfinding. The intensity of the light $L_3$ incident upon the light sensitive element 4 is proportional to the average brightness of the object to be photographed. Therefore, the arrangement of the present invention enables the operator to perform a proper exposure value setting operation in accordance with the average brightness of the object to be photographed.

In order to improve the brightness detecting sensitivity so as to obtain improved performance with a very poorly illuminated object, a high sensitivity device should be utilized for the light sensitive element 4, or alternatively, a reflecting surface 6 should be arranged at a suitable position relative to the light path leading to the viewfinder, for example at one side of the half-mirror optical system 2, so that a slight portion of the light to the viewfinder may be reflected and is led to the light sensitive element 4, thereby increasing the amount of light for exposure measurement. In this case, the light reflected by the reflector 6 is required only to be of such a small amount as to be just sufficient to supplement the light $L_3$. Therefore, the light led to the viewfinder is not diminished to such a degree as to cause any appreciable darkening of the field of view. Another expedient may be used for positively leading a portion of the light that has passed through the objective lens system 1 to the light sensitive element 4. The face of the shutter screen which is directed forwardly toward the objective 1 is provided with a reflecting surface so that when the shutter is closed the light is reflected first by said reflecting surface and then by the semi-reflector surface 2' of the semi-reflector optical system 2 so as to be led to the light sensitive element 4.

As stated above, in the system at the present invention, the light sensitive element 4 of the automatic diaphragm setting device 5 is positioned on one side of the semi-reflector optical system 2 so as to receive that portion of the light that has traversed the objective lens system 1 and which has hitherto been lost, to employ said light for measurement and control purposes. Therefore, the film exposure and viewfinder operations can be efficiently and accurately effected without diminishing the light that has passed the objective 1 for object brightness detecting operation.

Figure 2:
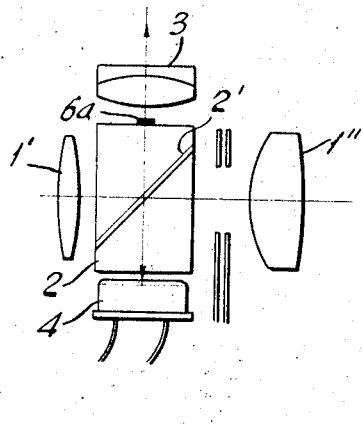
FIGURE 2 is a side elevational view of a section of another embodiment of the present invention.
Figure 3:
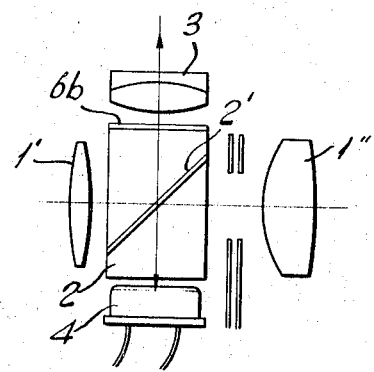
FIGURE 3 is a view similar to FIGURE 2 of still another embodiment of the present invention.

The embodiment of the present invention illustrated in FIGURE 2 of the drawing differs from that first described in that instead of the peripherally located reflector 6 there is provided a reflector 6a which is positioned on the semi-reflector device 2 at the optical axis of the viewfinder optical system 3 with its reflector surface facing the semi-reflector surface 2'. In the embodiment of the present invention shown in FIGURE 3 of the drawing, instead of the full reflecting members 6 and 6a the full upper face of the semi-reflector device 2 is provided with a horizontal semi-reflector surface 6b. In all other respects the embodiments of the present invention illustrated in FIGURES 2 and 3 are similar to that first described.

While there have been described and illustrated preferred embodiments of the present invention it is apparent that numerous alterations, omissions and additions may be made without departing from the spirit thereof.

What is claimed is:

1. In a camera including an objective lens system, a semi-reflector surface positioned across the path of image forming light rays traversing said objective lens system and inclined to the longitudinal axis thereof, a view finder optical system positioned on a first side of said semi-reflector surface and having directed thereto by said semi-reflector surface a fraction of the light entering said objective lens system, a photosensitive element positioned to receive light from the second opposite side of said semi-reflector surface, and a second reflector surface spaced from and positioned proximate said semi-reflector surface first side to reflect light reflected thereto by said semi-reflector surface back toward said photosensitive element.

2. The camera of claim 1 wherein said semi-reflector surface is flat and extends across the optical axis of said objective lens system and said photosensitive element is directed toward said semi-reflector surface to receive light reflected therefrom.

3. The camera of claim 2 wherein said semi-reflector surface is at an angle of 45° to the optical axis of said objective lens system and said viewfinder optical system and said photosensitive element are in substantially transverse alignment on opposite sides of said semi-reflector surface relative to said objective lens optical axis.

4. The camera of claim 2 wherein said objective lens system comprises a plurality of axially spaced lens, said semi-reflector surface being positioned between a pair of said lenses.

5. The camera of claim 1 including a variable opening diaphragm disposed rearwardly of said semi-reflector surface and means responsive to the light incident on said light sensitive element for varying the opening of said diaphragm.

6. The camera of claim 1 wherein said second reflector surface is semi-reflecting.

References Cited

UNITED STATES PATENTS

| | | | |
|---|---|---|---|
| 3,127,809 | 4/1964 | Denk | 352—142 XR |
| 3,327,600 | 6/1967 | Trankner | 95—42 |

NORTON ANSHER, *Primary Examiner*.

RICHARD L. MOSES, *Assistant Examiner*.

U.S. Cl. X.R.

88—1.5; 95—10, 64